(12) United States Patent
Hiramatu et al.

(10) Patent No.: US 9,370,060 B2
(45) Date of Patent: Jun. 14, 2016

(54) LIGHTING DEVICE AND ILLUMINATION APPARATUS INCLUDING SAME

(71) Applicant: Panasonic Intellectual Property Management Co., Ltd., Osaka (JP)

(72) Inventors: Akinori Hiramatu, Nara (JP); Hiroshi Kido, Osaka (JP); Junichi Hasegawa, Osaka (JP); Shigeru Ido, Osaka (JP); Daisuke Ueda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/518,391

(22) Filed: Oct. 20, 2014

(65) Prior Publication Data
US 2015/0145422 A1 May 28, 2015

(30) Foreign Application Priority Data
Nov. 22, 2013 (JP) ................................. 2013-242189

(51) Int. Cl.
*H05B 33/08* (2006.01)

(52) U.S. Cl.
CPC ........ *H05B 33/0815* (2013.01); *H05B 33/0803* (2013.01)

(58) Field of Classification Search
CPC ........... H05B 22/0818; H05B 33/0827; H05B 33/0842; H05B 33/0881; H05B 33/0815
USPC .................. 315/294, 193, 308, 122, 159, 161
See application file for complete search history.

(56) References Cited

U.S. PATENT DOCUMENTS

| | | | | |
|---|---|---|---|---|
| 5,463,252 A | * | 10/1995 | Jones et al. | 257/723 |
| 2001/0005319 A1 | | 6/2001 | Ohishi et al. | |
| 2007/0159750 A1 | * | 7/2007 | Peker | H05B 33/0869 361/93.1 |
| 2007/0210722 A1 | | 9/2007 | Konno et al. | |
| 2008/0179602 A1 | * | 7/2008 | Negley | H01L 21/2654 257/88 |
| 2008/0203946 A1 | * | 8/2008 | Ito et al. | 315/307 |
| 2009/0128045 A1 | * | 5/2009 | Szczeszynski et al. | 315/185 R |
| 2009/0134817 A1 | * | 5/2009 | Jurngwirth et al. | 315/307 |
| 2009/0167187 A1 | | 7/2009 | Kitagawa et al. | |
| 2009/0322234 A1 | * | 12/2009 | Chen et al. | 315/159 |
| 2010/0045204 A1 | * | 2/2010 | Snelten | 315/291 |
| 2011/0032244 A1 | * | 2/2011 | Kataoka | H05B 33/0815 345/212 |

(Continued)

FOREIGN PATENT DOCUMENTS

| | | |
|---|---|---|
| JP | 2001-185371 | 7/2001 |
| JP | 2007-35938 | 2/2007 |

(Continued)

*Primary Examiner* — Douglas W Owens
*Assistant Examiner* — Syed M Kaiser
(74) *Attorney, Agent, or Firm* — Renner, Otto, Boisselle & Sklar, LLP

(57) ABSTRACT

A lighting device includes: a plurality of DC power supply circuits. A plurality of light sources and switching units are connected to each of the DC power supply circuits, the switching units being configured to respectively switch electrical connection between the light sources and said each of the DC power supply circuits. A difference in rated voltage between any two light sources connected to one of the plurality of DC power supply circuits in common is smaller than a difference in rated voltage between two light sources respectively connected to different DC power supply circuits of the plurality of DC power supply circuits.

2 Claims, 2 Drawing Sheets

(56) References Cited

U.S. PATENT DOCUMENTS

| | | | |
|---|---|---|---|
| 2011/0062872 A1* | 3/2011 | Jin et al. | 315/122 |
| 2012/0112649 A1* | 5/2012 | Shimura | 315/188 |
| 2013/0313973 A1* | 11/2013 | DeNicholas et al. | 315/122 |
| 2013/0313982 A1* | 11/2013 | Reed | 315/186 |
| 2014/0009106 A1* | 1/2014 | Andrea | 320/107 |
| 2015/0077001 A1* | 3/2015 | Takahashi | H05B 33/0803 315/193 |

FOREIGN PATENT DOCUMENTS

| | | |
|---|---|---|
| JP | 2007-242427 | 9/2007 |
| JP | 2009-154748 | 7/2009 |
| JP | 2012-4054 | 1/2012 |

* cited by examiner

LIGHTING DEVICE AND ILLUMINATION APPARATUS INCLUDING SAME

CROSS-REFERENCE TO RELATED APPLICATION

This application claims priority to Japanese Patent Application No. 2013-242189 filed on Nov. 22, 2013, the entire contents of which are incorporated herein by reference.

TECHNICAL FIELD

The present disclosure relates to a lighting device and an illumination apparatus including the lighting device, and more particularly to a lighting device having a plurality of DC power supply circuits being controlled individually and an illumination apparatus including the lighting device.

BACKGROUND ART

Conventionally, an illumination apparatus including a plurality of DC power supply circuits being controlled individually has been proposed (see, e.g., Japanese Unexamined Patent Application Publication No. 2009-154748). Each of the DC power supply circuits turns on a light source such as an LED (Light Emitting Diode) array. That is, by individually controlling the DC power supply circuits, it is possible to vary the state of the light source such as a change in light output or an on/off state for each of the DC power supply circuits. For example, if a light color or an illumination range is different for each of the light sources, by individually controlling each of the DC power supply circuits as described above, it is possible to flexibly change the light color obtained by mixing colors or the illumination range as a whole.

Further, there has been also proposed an illumination apparatus in which a plurality of light sources is connected to one DC power supply circuit and is switched one by one. When a difference in rated voltage between the plurality of light sources connected to one DC power supply circuit is large, if it is switched from the light source having a high rated voltage to the light source having a low rated voltage, excessive electrical stress may be applied to the light source immediately after the switching.

SUMMARY OF THE INVENTION

In view of the above, the present disclosure provides a lighting device in which excessive electrical stress is hardly applied to a light source, and an illumination apparatus including the lighting device.

In accordance with an aspect of the present invention, there is provided a lighting device including: a plurality of DC power supply circuits. A plurality of light sources and switching units are connected to each of the DC power supply circuits, the switching units being configured to respectively switch electrical connection between the light sources and said each of the DC power supply circuits. A difference in rated voltage between any two light sources connected to one of the plurality of DC power supply circuits in common is smaller than a difference in rated voltage between two light sources respectively connected to different DC power supply circuits of the plurality of DC power supply circuits.

Each of the light sources connected to at least one of the DC power supply circuits may include an LED having a light emitting element and a phosphor for converting a light color of the light emitting element, and each of the light sources connected to at least another one of the DC power supply circuits may include an LED having no phosphor.

In accordance with another aspect of the present invention, there is provided an illumination apparatus including the lighting device described above.

In accordance with the aspects of the present invention, as compared to the case of connecting all light sources to one DC power supply circuit, electrical stress applied to the light sources when the switching units are changed over is suppressed. Also, as compared to the case of providing the DC power supply circuits in a number same as the number of the light sources, it is possible to reduce the size and the manufacturing cost.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Hereinafter, the best mode for implementing the embodiment of the present invention will be described in detail with reference to the accompanying drawings.

Figure 1:
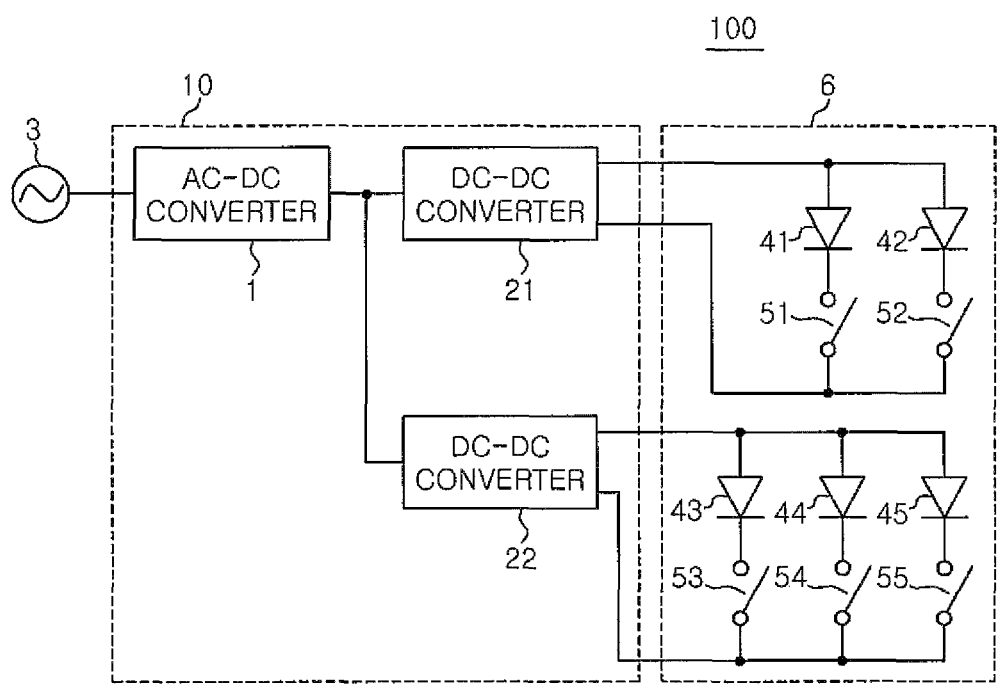
FIG. 1 is a block diagram illustrating an illumination apparatus in accordance with an embodiment.

The lighting device 10 in accordance with the present embodiment includes an AC-DC converter 1, and DC-DC converters 21 and 22 serving as DC power supply circuits, as shown in FIG. 1.

The AC-DC converter 1 converts AC power inputted from an external AC power source 3 into DC power. The AC-DC converter 1 may include, e.g., a diode bridge (not shown) and a well-known boost converter (not shown) for converting a DC output (ripple current) of the diode bridge into a DC power of a predetermined voltage.

Among a plurality of series circuits respectively including LEDs 41 to 45 serving as light sources and the switches 51 to 55 serving as switching units, some are connected in parallel to output terminals of the DC-DC converter 21 and the others are connected in parallel to output terminals of the DC-DC converter 22. Two of the series circuits are connected in parallel to one DC-DC converter (hereinafter, referred to as "first DC-DC converter") 21, and three of the series circuits are connected in parallel to the other DC-DC converter (hereinafter, referred to as "second DC-DC converter") 22. For each of the DC-DC converters 21 and 22, if one of the switches (i.e., one of switches 51 and 52 for the first DC-DC converter 21 and one of the switches 53 to 55 for the second DC-DC converter 22) is turned on and the other one (or the others) thereof is turned off, the LED connected to the switch which is turned on is electrically connected to the DC-DC converters 21 or 22, selectively.

Also, the present embodiment includes an instruction input circuit (not shown) to which a control instruction is inputted, and a control circuit (not shown) which controls each of the DC-DC converters 21 and 22 and each of the switches 51 to 55 according to the instruction inputted to the instruction input circuit. The instruction input circuit may receive a signal from a remote controller (not shown) or may receive an operation input through a well-known input device such as a touch panel or a push button. Since the instruction input circuit or the control circuit can be realized by well-known technique, detailed illustration and description will be omitted.

Each of the LEDs 41 and 42 connected to the first DC-DC converter 21 is for main illumination. Each of the LEDs 41 and 42 includes a light emitting element and a phosphor which converts the light color of the light emitting element. The light emitting diode 41 is a white LED in which the components of the phosphor and the amounts thereof are set such that the mixed color of a light (e.g., blue light) of the LED and a light (e.g., yellow light) of the phosphor is white. Further, the LED 42 is a warm white LED in which the components of the phosphor and the amounts thereof are set such that the mixed color of a light of the LED and a light of the phosphor is warm white.

Each of the LEDs 43 to 45 connected to the second DC-DC converter 22 is an LED for mood lighting, which does not include the above-described phosphor. Among the LEDs 43 to 45, the LED 43 is intended to generating red light, the LED 44 is intended to generate green light, and the LED 45 is intended to generate blue light.

Each of the DC-DC converters 21 and 22 converts the DC power inputted from the AC-DC converter 1 into DC power (e.g., DC power having a current value maintained at a predetermined target current value) suitable for lighting of the LEDs 41 and 42, and LEDs 43 to 45 respectively connected thereto, and outputs the converted DC power. As the DC-DC converters 21 and 22, e.g., a well-known switching power supply circuit such as a buck converter (also called a step-down chopper circuit) may be used.

Each of the DC-DC converters 21 and 22 may perform a constant current operation to output a constant current. In this case, the number of the switches which can be turned on simultaneously for each of the DC-DC converters 21 and 22 is one. The LEDs 41 and 42 are electrically connected to the DC-DC converter 21 one by one and, also, the LEDs 43 to 45 are electrically connected to the DC-DC converter 22 one by one. Thus, a changing-over switch may be used instead of the plurality of switches 51 and 52 or the plurality of the switches 53 to 55.

Alternatively, each of the DC-DC converters 21 and 22 may perform a constant voltage operation to output a constant voltage. In this case, it is necessary for a current limiting resistor (not shown) to be connected in series to each of the LEDs 41 to 45. In this case, although the loss due to the resistor may be generated, the switches 51 and 52 can be turned on simultaneously for the first DC-DC converter 21 and, also, the switches 53 to 55 can be turn on simultaneously for the second DC-DC converter 22.

In the present embodiment, the LEDs connected to the DC-DC converter 21 or 22 in common have similar V-I characteristics. Specifically, each of the two LEDs 41 and connected to the first DC-DC converter 21 has a relatively high forward voltage or rated voltage for illumination. Further, each of the LEDs 43 to 45 connected to the second DC-DC converter 22 has a relatively low forward voltage or rated voltage for mood lighting. In addition, a difference in rated voltage between the LEDs connected to the DC-DC converter 21 or 22 in common is set to be smaller than a difference in rated voltage between the LEDs connected to the different DC-DC converters 21 and 22, respectively. For example, a difference in rated voltage between the LEDs 41 and 42 connected to the first DC-DC converter 21 is smaller than a difference between the rated voltage of any one of the LEDs 41 and 42 connected to the first DC-DC converter 21 and the rated voltage of any one of the LEDs 43 to 45 connected to the second DC-DC converter 22.

With the above configuration, as compared to the case of connecting all LEDs (e.g., the LEDs 41 to 45) to one DC-DC converter (e.g., first DC-DC converter 21), electrical stress applied to the LEDs 41 to 45 when the switches 51 to 55 are changed over is suppressed.

Further, as compared to the case of providing the DC-DC converters in the same number as the number of the LEDs, it is possible to reduce the size and the manufacturing cost.

Further, although each light source includes one of the LEDs 41 to 45 in FIG. 1, an LED array including a plurality of LEDs may be used as the light source. Alternatively, as the light sources, e.g., other well-known electric light sources such as organic EL (ElectroLuminescence) elements may be used instead of the LEDs 41 to 45. Further, as the power source of the DC-DC converters 21 and 22, other DC power sources such as a battery may be used instead of the AC-DC converter 1.

Further, the number of the DC-DC converters 21 and 22 may be three or more. Furthermore, the number of the series circuits including the switches and the LEDs connected to each of the DC-DC converters 21 and 22 may be four or more.

Figure 2:
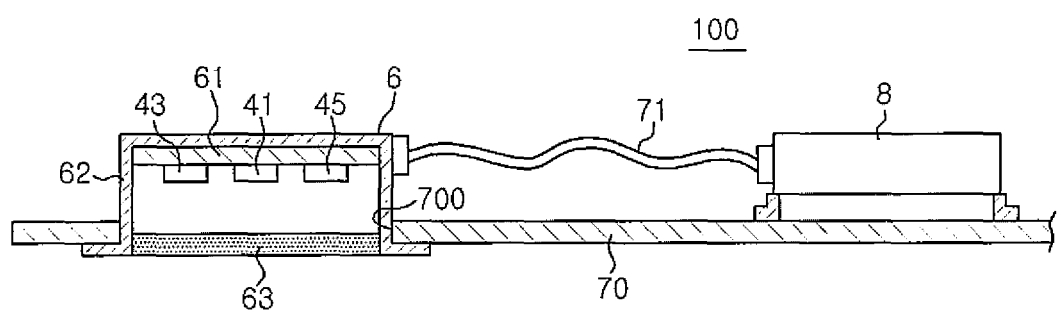
FIG. 2 is an explanatory diagram showing an appearance of the illumination apparatus.

The above-described lighting device 10 may be used in an illumination apparatus 100, e.g., as shown in FIG. 2. In the example of FIG. 2, the LEDs 41 to 45 and the switches 51 to 55 are mounted on one printed wiring board 61. Also, the printed wiring board 61 is fixed to the inner bottom surface of a case 62 which has an opening at a lower side thereof, while its mounting surface is directed downward. The printed wiring board 61 and the case 62 constitute a lighting body 6. Further, the lighting body 6 is formed of a light transmitting material such as acrylic resin and includes a light transmitting cover 63 which closes the opening of the case 62. The light from each of the LEDs 41 to 45 is emitted downward through the cover 63. In addition, the case 62 is fitted in a through hole 700 provided in a ceiling wall 70. The ceiling wall 70 is a plate which is fixed to form a gap (so-called wiring space) between the ceiling wall 70 and a construction material such as concrete while its thickness direction coincides with a vertical direction.

The lower surface of the ceiling wall 70 constitutes a ceiling surface. Further, the AC-DC converter 1, the DC-DC converters 21 and 22, the instruction input circuit, and the control circuit are accommodated in a housing 8 separate from the case 62 and connected to the printed wiring board 61 through a cable 71. The cable 71 includes two sets of power supply lines connected to the DC-DC converters 21 and 22, and signal lines for controlling the switches 51 to 55. The housing 8 is installed on the ceiling wall 70 at the side of the lighting body 6. Thus, as compared to the case where the housing 8 is installed on the upper side of the lighting body 6, a gap required above the ceiling wall 70 is reduced.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination apparatus comprising:
a plurality of DC power supply circuits; and
a plurality of series circuits connected in parallel to each of the DC power supply circuits,
wherein each of the series circuits includes one or more light sources and a switching unit configured to switch electrical connection between the light sources and said each of the DC power supply circuits, and wherein a difference in rated voltage between any two light sources connected to one of the plurality of DC power supply circuits in common is smaller than a difference in rated voltage between any two light sources respectively connected to different DC power supply circuits of the plurality of DC power supply circuits to thereby reduce electrical stress when switching units of the series circuits switch the electrical connection between the light sources and said each of the DC power supply circuits.

2. The illumination apparatus of claim 1, wherein each of the light sources connected to at least one of the DC power supply circuits includes an LED having a light emitting element and a phosphor for converting a light color of the light emitting element, and each of the light sources connected to at least another one of the DC power supply circuits includes an LED having no phosphor.

* * * * *